(12) United States Patent
Lee

(10) Patent No.: US 7,915,774 B2
(45) Date of Patent: Mar. 29, 2011

(54) SPINDLE MOTOR

(75) Inventor: Tae Wook Lee, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/212,026

(22) Filed: Sep. 17, 2008

(65) Prior Publication Data

US 2009/0072646 A1   Mar. 19, 2009

(30) Foreign Application Priority Data

Sep. 17, 2007 (KR) .................. 10-2007-0094123

(51) Int. Cl.
| | |
|---|---|
| H02K 5/16 | (2006.01) |
| H02K 5/24 | (2006.01) |
| H02K 7/00 | (2006.01) |
| H02K 7/09 | (2006.01) |
| H02K 21/12 | (2006.01) |

(52) U.S. Cl. .......... 310/90; 310/51; 310/67 R; 310/90.5; 310/156.04; 310/156.12

(58) Field of Classification Search .......... 310/90, 310/156.12, 156.04, 67 R, 68, 91, 90.5, 152, 310/266, 51, 156.26, 152.266; 720/703–709, 720/715–716; 369/176, 270.1

See application file for complete search history.

(56) References Cited

U.S. PATENT DOCUMENTS

| | | | |
|---|---|---|---|
| 5,334,896 A | 8/1994 | Ohsawa | |
| 5,723,927 A * | 3/1998 | Teshima | 310/90 |
| 2004/0232781 A1* | 11/2004 | Yoo | 310/51 |
| 2005/0210490 A1* | 9/2005 | Shimizu et al. | 720/697 |
| 2007/0236099 A1* | 10/2007 | Kim et al. | 310/266 |
| 2007/0284972 A1* | 12/2007 | Kim | 310/67 R |
| 2007/0290571 A1* | 12/2007 | Yoon | 310/261 |
| 2008/0018187 A1* | 1/2008 | Yamaguchi et al. | 310/81 |
| 2008/0046906 A1* | 2/2008 | Takaki et al. | 720/707 |

FOREIGN PATENT DOCUMENTS

| | | | |
|---|---|---|---|
| JP | 05111208 A * | 4/1993 | |
| JP | 9-245426 A | 9/1997 | |
| JP | 2000-253614 A | 2/1999 | |
| JP | 11113210 A * | 4/1999 | |
| JP | 11236921 A * | 8/1999 | |
| JP | 2003-262217 A | 9/2003 | |
| JP | 2004194460 A * | 7/2004 | |
| JP | 2004-270820 A | 9/2004 | |
| JP | 2006-316921 A | 11/2006 | |
| KR | 10-0641995 B1 | 10/2006 | |
| KR | 10-2007-0092004 A | 9/2007 | |
| KR | 10-2009-0028958 A | 3/2009 | |

OTHER PUBLICATIONS

Machine Translation JP11236921 A (1999).*
Machine Trnaslation JP2004194460 (2004).*
Machine Translation JP11113210 (1999) and JP05111208 (1993).*

* cited by examiner

*Primary Examiner* — Quyen Leung
*Assistant Examiner* — Jose A Gonzalez Quinones
(74) *Attorney, Agent, or Firm* — Saliwanchik, Lloyd & Eisenschenk

(57) ABSTRACT

A spindle motor is provided. The spindle motor includes a base, a bearing housing, a bearing, a rotation shaft, a stator, a bushing, and a rotor. The bearing housing is installed on the base. The bearing is fixed inside the bearing housing. The rotation shaft is installed to be supported by and rotate on the bearing. The stator is disposed around the bearing housing. The bushing is coupled to the rotation shaft. The rotor is coupled to the bushing to rotate through interaction with the stator.

35 Claims, 1 Drawing Sheet

SPINDLE MOTOR

CROSS-REFERENCE TO RELATED APPLICATION

The present application claims the benefit under 35 U.S.C. §119 of Korean Patent Application No. 10-2007-0094123, filed Sep. 17, 2007, which is hereby incorporated by reference in its entirety.

BACKGROUND

The present embodiments relate to a spindle motor.

A spindle motor performs the function of rotating a disk to enable an optical pickup to read data recorded on the disk.

The spindle motor is provided with a rotor yoke coupled to a rotation shaft, and a disk is mounted at the top of the rotor yoke to rotate the disk.

Due to miniaturization and slimming of spindle motors, their rotation shafts have progressively been shortened in length, thereby reducing the coupling area between a rotation shaft and a rotor yoke and weakening the coupled strength between the rotation shaft and the rotor yoke.

Accordingly, when disks are mounted on and removed from the rotor yoke, the rotor yoke is prone to disengage from the rotation shaft.

BRIEF SUMMARY

Embodiments provide a spindle motor.

Embodiments also provide a spindle motor capable of firmly supporting a rotor yoke on a rotation shaft.

In one embodiment, a spindle motor includes: a base; a bearing housing installed on the base; a bearing fixed inside the bearing housing; a rotation shaft rotatably installed into the bearing; a stator disposed around the bearing housing; a bushing coupled to the rotation shaft; and a rotor coupled to the bushing to rotate through interaction with the stator.

In another embodiment, a spindle motor includes: a base; a bearing housing installed on the base; a bearing fixed within the bearing housing; a rotation shaft rotatably installed into the bearing; a stator including a core disposed around the bearing housing, and a coil wound on the core; a bushing coupled to the rotation shaft; a rotor including a rotor yoke coupled to the bushing, and a magnet coupled to the rotor yoke; and a clamp coupled at a top of the rotor yoke.

The details of one or more embodiments are set forth in the accompanying drawing and the description below. Other features will be apparent from the description and drawing, and from the claims.

DETAILED DESCRIPTION

Figure 1:
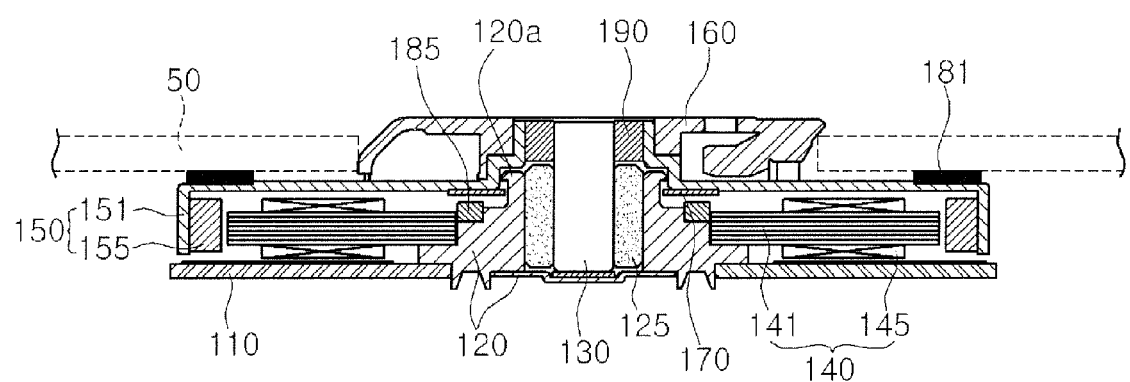
FIG. 1 is a cross-sectional view of spindle motor according to embodiments of the present invention.

Reference will now be made in detail to a spindle motor according to the embodiments of the present invention, examples of which are illustrated in the accompanying drawing.

FIG. 1 is a cross-sectional view of spindle motor according to embodiments of the present invention.

Referring to FIG. 1, a base housing 120 is vertically installed on a base 110. A bearing 125 is fixed within the bearing housing 120, and the lower portion of a rotation shaft 130 is installed to be supported and able to rotate in the bearing 125.

A stator 140 and a rotor 150 are coupled to the bearing housing 120 and the rotation shaft 130, respectively.

The stator 140 has a core 141 coupled to the outer periphery of the bearing housing 120, and a coil 145 wound on the core 141. The stator 140 may be disposed around the bearing housing 120 and supported by the base 110.

The rotor 150 includes a rotor yoke 151 supported on the rotation shaft 130 exposed to the outside of the bearing housing 120, and a magnet 155 coupled to the rotor yoke 151 in opposition to the stator 140.

Accordingly, when a current is applied to the coil 145, the rotor 150 and the rotation shaft 130 are rotated through electromagnetic fields formed between the coil 145 and the magnet 155.

The rotor yoke 151 is provided in a cylindrical shape with an open bottom, and a disk 50 is mounted and supported on the upper surface of its upper plate. Also, a clamp 160, that elastically supports the disk 50, is installed on the outer perimeter of the rotor yoke 151 coupled to the rotation shaft 130, in order to align the center of the mounted disk 50 with the center of the rotation shaft 130.

An annular stopper 170 is coupled to the lower surface of the upper plate of the rotor yoke 151, and a protruding portion 120a is formed projecting radially outward from the top of the bearing housing 120. The vertical portions of the stopper 170 and the protruding portion 120a are partially overlapped.

When the disk 50 is separated from the clamp 160, the stopper 170 and the protruding portion 120a inhibit the rotation shaft 130 and the rotor 150 from disengaging upward.

Also, a rubber liner 181 is fixed on the upper surface perimeter of the rotor yoke 151 to contact the disk 50. The rubber liner 181 increases friction with the disk 50 to inhibit slippage caused by the rotational inertia of the disk 50 contacting and rotating on the rubber liner 181.

A bushing 190 is press-fitted in the upper portion of the rotation shaft 130, and the rotor yoke 151 is mounted to the bushing 190. Specifically, the inner surface of the bushing 190 contacts the outer surface of the rotation shaft 130, and the outer surface of the bushing 190 contacts the inner surface of the rotor yoke 151.

According to one embodiment, the vertical portions of the rotation shaft 130 and the bushing 190 that contact one another have a length of approximately 0.8 mm to 1.5 mm, so that when assuming the diameter of the rotation shaft 130 is approximately 2 mm, there is the limitation of a weak coupling between the rotation shaft 130 and the rotor yoke 151 arising from an insufficient coupling area when the latter are directly coupled.

Accordingly, in present embodiments, the rotation shaft 130 and the bushing 190 are coupled, and the bushing 190 and the rotor yoke 151 are coupled, to increase the coupling area of the rotor yoke 151 and resultantly increase the strength of the coupling.

For example, when the radius of the rotation shaft 130 is R1, the thickness of the bushing 190 in a radial direction is R2, the vertical length of the contacting area between the rotation shaft 130 and the bushing 190 is L, and the coupling area between the rotor yoke 151 and the bushing 190 is A, it then follows that $A=2\pi(R1+R2)L$. That is, when the bushing 190 is installed between the rotation shaft 130 and the rotor yoke 151, the coupling area increases by $2\pi(R2)L$.

Resultantly, by coupling the bushing 190 to the rotation shaft 130 and coupling the rotor yoke 151 to the bushing 190, the coupled strength between the rotor yoke 151 and the rotation shaft 130 can be increased.

The bushing 190 is coupled by being press-fitted over the rotation shaft 130, and the rotor yoke 151 is coupled by being adhered to the bushing 190.

A suction magnet 185 is installed at the upper portion of the bearing housing 120. When the rotation shaft 130 and the rotor 150 rotate, the suction magnet 185 inhibits the rotation shaft 130 and the rotor 150 from rising.

As described above, a spindle motor according to embodiments of the present invention may be designed as a slim spindle motor with minimal thickness, so that there is no reduction in the strength of a coupling between a rotation shaft and a rotor yoke even when the rotation shaft is designed to have a short length.

That is, a spindle motor according to embodiments of the present invention has a rotor yoke coupled to an outer periphery of a bushing fixed to the outer periphery of a rotation shaft, to increase the coupled strength of the rotor yoke and prevent the rotor yoke from disengaging from the rotation shaft. Thus, product reliability is improved.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor comprising:
a base;
a bearing housing installed on the base;
a bearing fixed inside the bearing housing;
a rotation shaft rotatably installed into the bearing;
a stator disposed around the bearing housing;
a bushing coupled to the rotation shaft, wherein the bushing has a substantially uniform thickness in a radial direction;
a rotor coupled to the bushing to rotate through interaction with the stator, wherein the rotor comprises a rotor yoke coupled to the bushing and a magnet coupled to the rotor yoke, wherein the rotor yoke contacts the outermost periphery of the bushing; and
a clamp coupled to the rotor yoke,
wherein the bushing is spaced from the clamp,
wherein an uppermost surface of the bushing is lower than an uppermost surface of the clam, and wherein a lowermost surface of the bushing is higher than a lowermost surface of the clamp.

2. The spindle motor according to claim 1, wherein the bushing is coupled through being press-fitted to the rotation shaft.

3. The spindle motor according to claim 1, wherein the rotor yoke is coupled through adhesion to the bushing.

4. The spindle motor according to claim 1, wherein the bearing housing comprises a protruding portion projecting radially outward from an upper portion thereof, and the rotor comprises a stopper on a lower surface thereof to partially overlap in a vertical direction with the protruding portion.

5. The spindle motor according to claim 1, wherein an area over which the rotation shaft and the bushing contact extends vertically over a length of between 0.8 mm and 1.5 mm.

6. A spindle motor comprising:
a base;
a bearing housing installed on the base;
a bearing fixed within the bearing housing;
a rotation shaft rotatably installed into the bearing;
a stator comprising a core disposed around the bearing housing, and a coil wound on the core;
a bushing coupled to the rotation shaft;
a rotor comprising a rotor yoke coupled to the bushing, and a magnet coupled to the rotor yoke, wherein the bushing is contacted by only the rotation shaft and an innermost surface of the rotor yoke; and
a clamp coupled to the rotor yoke, wherein the clamp is configured to elastically support a disk mounted on the rotor yoke,
wherein the bushing is spaced from the clamp,
wherein an uppermost surface of the bushing is lower than an uppermost surface of the clamp, and wherein a lowermost surface of the bushing is higher than a lowermost surface of the clamp.

7. The spindle motor according to claim 6, wherein at least a portion of the rotation shaft, the bushing, the rotor yoke, and the clamp are disposed on a same horizontal plane.

8. The spindle motor according to claim 6, further comprising a rubber liner installed on an upper surface of the rotor yoke.

9. The spindle motor according to claim 6, wherein the bearing housing comprises a protruding portion projecting radially outward from an upper portion thereof, and the rotor comprises a stopper on a lower surface thereof to partially overlap in a vertical direction with the protruding portion.

10. The spindle motor according to claim 6, wherein an area over which the rotation shaft and the bushing contact extends vertically over a length of between 0.8 mm and 1.5 mm.

11. The spindle motor according to claim 1, wherein the rotor yoke comprises a first vertical portion faced to the bushing, a first horizontal portion extended from the first vertical portion in a radial direction, a second vertical portion extended from the first horizontal portion in a vertical direction, a second horizontal portion extended from the second vertical portion in the radial direction, and a third vertical portion extended from the second horizontal portion in the vertical direction,
wherein the second horizontal portion is provided with a stopper, and wherein the third vertical portion is provided with the magnet.

12. The spindle motor according to claim 11, wherein the stopper is formed in a flat plate type.

13. The spindle motor according to claim 6, wherein the rotor yoke comprises a first vertical portion faced to the bushing, a first horizontal portion extended from the first vertical portion in a radial direction, a second vertical portion extended from the first horizontal portion in a vertical direction, a second horizontal portion extended from the second vertical portion in the radial direction, and a third vertical portion extended from the second horizontal portion in the vertical direction, wherein the second horizontal portion is provided with a stopper, and wherein the third vertical portion is provided with the magnet.

14. The spindle motor according to claim 13, wherein the stopper is formed in a flat plate type.

15. A spindle motor comprising:
a base;
a bearing housing installed on the base;
a bearing fixed inside the bearing housing;
a rotation shaft rotatably installed into the bearing;
a stator disposed around the bearing housing;
a bushing coupled to the rotation shaft;
a rotor coupled to the bushing to rotate through interaction with the stator, wherein the rotor comprises a rotor yoke coupled to the bushing and a magnet coupled to the rotor yoke; and
a clamp coupled to the rotor yoke,
wherein the rotor yoke comprises a first vertical portion faced to the bushing, a first horizontal portion extended from the first vertical portion in a radial direction, a second vertical portion extended downward from the first horizontal portion in a vertical direction, a second horizontal portion extended from the second vertical portion in the radial direction, and a third vertical portion extended downward from the second horizontal portion in the vertical direction,
wherein the second vertical portion is overlapped with the bearing housing in a vertical direction,
wherein the bushing is spaced from the clamp,
wherein an uppermost surface of the bushing is lower than an uppermost surface of the clamp, and wherein a lowermost surface of the bushing is higher than a lowermost surface of the clamp.

16. The spindle motor according to claim 15, wherein the bushing is between the rotation shaft and an inner peripheral surface of the first vertical portion.

17. The spindle motor according to claim 15, wherein, in the radial direction, the bushing is completely between an inner surface of the first vertical portion and an outer surface of the rotating shaft.

18. The spindle motor according to claim 15, further comprising a second magnet on the bearing housing, wherein the second horizontal portion is provided with a stopper on a lower surface thereof, wherein a portion of the stopper overlaps the second magnet.

19. The spindle motor according to claim 15, wherein an upper portion of the bearing has a smaller diameter than the second vertical portion of the rotor yoke, and a lower portion of the bearing housing has a larger diameter than the second vertical portion of the rotor yoke.

20. The spindle motor according to claim 15, further comprising a rubber liner disposed on the second horizontal portion of the rotor yoke.

21. The spindle motor according to claim 20, wherein an outer circumference of the rubber liner is arranged radially at a same position as an outer circumference of the magnet.

22. The spindle motor according to claim 15, wherein an outer circumference of the bushing has a smaller diameter than an outer circumference of the bearing.

23. The spindle motor according to claim 15, wherein the stator includes a core and coils, and wherein a peripheral portion of the core slants to an upper direction.

24. The spindle motor according to claim 15, wherein an upper portion of the bearing is protruded from the bearing housing, wherein a peripheral portion of the upper portion of the bearing includes a curved surface, and wherein the curved surface of the bearing is faced with an interface between the second vertical portion and the second horizontal portion.

25. A spindle motor comprising:
a base;
a bearing housing installed on the base;
a bearing inside the bearing housing;
a rotation shaft rotatably installed in the bearing;
a stator disposed around the bearing housing;
a bushing coupled to the rotation shaft;
a rotor coupled to the bushing to rotate through interaction with the stator; and
a clamp coupled to the rotor,
wherein the rotor comprises:
a first vertical portion faced to the bushing such that the bushing is between the rotor and the shaft,
a first horizontal portion extended from the first vertical portion in a radial direction,
a second vertical portion extended from the first horizontal portion in a vertical direction,
a second horizontal portion extended from the second vertical portion in the radial direction, wherein an upper surface of the second horizontal portion supports a disk,
a third vertical portion extended from the second horizontal portion in the vertical direction, and
a magnet coupled to the third vertical portion,
wherein the first vertical portion contacts the bushing along a substantial entire vertical length of the bushing,
wherein the bushing is spaced from the clamp,
wherein an uppermost surface of the bushing is lower than an uppermost surface of the clamp, and wherein a lowermost surface of the bushing is higher than a lowermost surface of the clamp.

26. The spindle motor according to claim 25, wherein, in the radial direction, the bushing is completely between an inner surface of the first vertical portion and an outer surface of the rotating shaft.

27. The spindle motor according to claim 25, wherein the bearing housing comprises a protruding portion projecting radially outward from an upper portion thereof.

28. The spindle motor according to claim 27, further comprising a stopper on a lower surface of the second horizontal portion, wherein the stopper is overlapped with the protruding portion in a vertical direction.

29. The spindle motor according to claim 28, further comprising a second magnet installed on the bearing housing, wherein a portion of the stopper overlaps the second magnet.

30. The spindle motor according to claim 25, further comprising a rubber liner on the upper surface of the second horizontal portion.

31. The spindle motor according to claim 30, wherein an outer circumference of the rubber liner is arranged radially at a same position as an outer circumference of the magnet.

32. The spindle motor according to claim 25, wherein a portion of the clamp has an inner surface contacting an outer surface of the first vertical portion, an upper surface of the first horizontal portion, and an outer surface of the second vertical portion of the rotor yoke.

33. The spindle motor according to claim 25, wherein an outer circumference of the bushing has a smaller diameter than an outer circumference of the bearing.

34. The spindle motor according to claim 25, wherein a peripheral portion of the core slants to an upper direction.

35. The spindle motor according to claim 25, wherein an upper portion of the bearing is protruded from the bearing housing, wherein a peripheral of the upper portion of the bearing includes a curved surface, and wherein the curved surface of the bearing is faced with an interface between the second vertical portion and the second horizontal portion.

* * * * *